(12) United States Patent
Sugaya et al.

(10) Patent No.: US 6,301,208 B1
(45) Date of Patent: Oct. 9, 2001

(54) OPTICAL DISK HAVING RADIAL LANDS AND GROOVES, AND BOUNDARY RECOGNITION MARKS, AND OPTICAL DISK APPARATUS FOR EMITTING A LIGHT BEAM TO AN OPTICAL DISK HAVING A PLURALITY OF ERROR CORRECTION BLOCKS AFTER BOUNDARY RECOGNITION MARKS

(75) Inventors: Toshihiro Sugaya, Ibaraki-ken; Hiromichi Kobori, Yokohama; Kazuo Watabe, Kawasaki, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/220,696

(22) Filed: Dec. 24, 1998

(30) Foreign Application Priority Data

Dec. 26, 1997 (JP) .................................................. 9-358856

(51) Int. Cl.⁷ .................................................. G11B 7/0045
(52) U.S. Cl. .................. 369/47.1; 369/53.37; 369/275.3; 369/53.11; 369/47.16
(58) Field of Search ............................ 369/47, 50, 53.11, 369/53.2, 53.31, 275.3, 47.11, 47.15, 47.16

(56) References Cited

U.S. PATENT DOCUMENTS

| 5,774,437 | * | 6/1998 | Yoshida | 369/50 |
| 5,793,722 | * | 8/1998 | Yamamuro | 369/44.28 |
| 5,850,382 | * | 12/1998 | Koishi et al. | 36/275.3 |
| 5,930,222 | * | 7/1999 | Yoshida et al. | 369/275.4 |
| 5,936,933 | * | 8/1999 | Miyamoto et al. | 369/275.3 |
| 6,091,682 | * | 8/1998 | Hikima | 369/47 |
| 6,137,768 | * | 10/2000 | Ishida et al. | 369/275.3 |
| 6,175,686 | * | 1/2001 | Noda | 386/123 |
| 6,215,750 | * | 4/2001 | Sako et al. | 369/59 |

FOREIGN PATENT DOCUMENTS

| 786767 | 7/1997 | (EP) . |
| 801382 | 10/1997 | (EP) . |
| 821350 | 1/1998 | (EP) . |
| 98/19302 | 5/1998 | (WO) . |

* cited by examiner

*Primary Examiner*—Aristotelis M. Psitos
(74) *Attorney, Agent, or Firm*—Pillsbury Winthrop LLP (57) ABSTRACT

An optical disk used for writing and reading data in units of an error correction block containing a plurality of sectors by means of a light beam and comprising land and groove tracks arranged adjacent to one another and a plurality of emboss pits formed on a boundary between the land and the groove tracks to detect respective positions of the error correction blocks.

21 Claims, 10 Drawing Sheets

OPTICAL DISK HAVING RADIAL LANDS AND GROOVES, AND BOUNDARY RECOGNITION MARKS, AND OPTICAL DISK APPARATUS FOR EMITTING A LIGHT BEAM TO AN OPTICAL DISK HAVING A PLURALITY OF ERROR CORRECTION BLOCKS AFTER BOUNDARY RECOGNITION MARKS

BACKGROUND OF THE INVENTION

The present invention relates to a data readable an d writable optical disk and an optical disk apparatus for driving it.

In a rewritable optical disk capable of repeatedly writing data in arbitrary positions on the disk and reading out data from arbitrary positions on the disk, data is generally written in units of one sector. In each sector, sector address data and error correction coded data are written.

To the contrary, in a recently standardized large-capacity rewritable optical disk 120 mm in diameter called a DVD-RAM, data can be written in units of not one sector but one error correction block (ECC block) obtained by error correction coding of a plurality of sectors in order to improve the data error correction ability. Similarly, in a DVD-ROM as a read-only optical disk, data is written in units of one error correction block formed from 16 sectors each including 2,048-byte data. In the DVD-ROM, both an error correction block and sector address information undergo error correction coding similar to data, thereby attaining a structure virtually free from any error.

In the DVD-RAM, address information in unit of one sector are written as emboss pits in the disk in advance. In writing data, a plurality of sectors (16 sectors) constitute one error correction block. Thus, address information can always be obtained in units of one sector. Even when, for example, the optical head erroneously moves to an adjacent track during writing, the write error can be limited to one sector, and the seek time can be shortened. Further, since a periodic signal corresponding to the sector period can always be obtained from the address information of a sector during a write/read, the spindle motor for rotating the optical disk can be controlled in accordance with this periodic signal.

In a method of writing address information in units of one sector, like a conventional DVD-RAM, each sector must have many areas other than the area for writing data, such as a buffer area for coping with a change in actual sector length on the disk caused by variations in rotation speed or decentering of the disk during writing/reading out data, and a buffer area for co ping with random shifts of write-in positions and deterioration of start and end positions in the phase change recording scheme, in addition to the address information area (header field). This decreases the format efficiency. To ensure a sufficient write-in capacity, the write-in density must be increased. If the write-in density is not changed, the write-in density decreases.

As a method of writing data in an optical disk without forming address information in units of one sector, a groove in the optical disk is wobbled to write address information as an FM signal, and data is written in units of one error correction block on the basis of the address information. This is employed in a CD-R, CD-RW, and the like. In this case, the address of an error correction block is determined only after data is written, so data is generally difficult to efficiently write in an arbitrary position.

The address information of an error correction block and the address information of a sector cannot be extracted unless error correction coded data is decoded. If an address error occurs during a write, the error cannot be corrected, and data may be written in an erroneous address. Furthermore, the error correction must be executed for the address information even if the seek operation is performed for another track. As a result, the time required for seeking a target address becomes long, so that the wait time in data reading and writing becomes long. In addition, address information written as a groove wobble may deteriorate during a several number of writes.

In an area where data is written, a periodic signal corresponding to the sector period necessary to control the spindle motor can be obtained from the optical disk. However, in an area where no data is written, no periodic signal can be obtained. Finalization for writing a dummy signal for generating a periodic signal must be performed for a plurality of tracks after data is written, which prolongs the write-in time.

As described above, of conventional rewritable optical disks, an optical disk for writing address information in units of one sector as pre-pits requires, for each sector, buffer areas for coping with a change in actual sector length resulting from variations in rotation speed or decentering of the disk and coping with random shifts of write-in positions and deterioration of start and end positions in the phase change recording scheme. This increases the number of areas other than the area for writing data and decreases the format efficiency.

In an optical disk in which a groove is wobbled to write address information and data is written in units of one error correction block, data is difficult to efficiently write in an arbitrary position. Address information in units of one sector cannot be obtained unless error correction coded data is decoded. Moreover, finalization for generating a periodic signal for controlling the spindle motor must be performed to extend the write-in time.

BRIEF SUMMARY OF THE INVENTION

It is an object of the present invention to provide a rewritable optical disk capable of increasing the format efficiency, efficiently writing data in an arbitrary position, and obtaining address information in units of one sector without decoding error correction coded data, and an optical disk apparatus for driving the optical disk.

It is another object of the present invention to provide an optical disk and optical disk apparatus capable of controlling rotation using a signal obtained from the optical disk without any extra process of finalization.

According to the present invention, there is provided An optical disk used for writing and reading data in units of an error correction block containing a plurality of sectors by means of a light beam comprising land and groove tracks arranged adjacent to one another, and a plurality of recognition marks formed on a boundary between the land and the groove tracks to recognize a position of the error correction blocks.

According to the present invention, there is provided an optical disk apparatus comprising an optical head facing an optical disk for writing and reading data therein and therefrom, the optical disk having land and groove tracks arranged adjacent to one another and a plurality of recognition marks formed on a boundary between the land and the groove tracks and used for recognizing respective positions of the error correction blocks, and the optical head detecting the recognition marks to output a detection signal, a signal generator which generates a recognition signal corresponding to the recognition marks on the basis of the detection signal from the optical head, a driver which drives the optical head in accordance with the recognition signal and write information in a writing mode to write data in the error correction blocks corresponding to the detected recognition marks, and a signal processor which processes data read out from the optical disk by the optical head to output a reproduced signal.

In this way, recognition information of the error correction block is written as emboss pits in the optical disk. Data of each sector of the error correction block and address information of the sector are written on the basis of this recognition information. This allows to form, in units of one error correction block, buffer areas for coping with a change in actual sector length on the disk arising from variations in rotation speed or decentering of the disk during writing/ reading out data and coping with random shifts of write-in positions and deterioration of start and end positions in the phase change recording scheme. Compared to a conventional optical disk in which address information in units of one sector is written as emboss pits, the buffer area can be greatly decreased to widen the area for writing data, resulting in a high format efficiency.

Since the positions of error correction blocks on the optical disk are determined in advance, data can be written in an arbitrary error correction block in writing data. In addition, error correction is performed for data within the error correction block but is not for address information of the sector. The sector address can therefore be recognized in real time without decoding the error correction block. Even if an address error occurs during a write, the address can be easily corrected.

In the optical disk apparatus according to the present invention, the land and groove tracks on the optical disk are wobbled with a wobble pattern having a predetermined period. A periodic signal corresponding to the wobble pattern is generated from an output from the photo-detector for detecting reflection light by the optical disk. Rotation of the optical disk is controlled based on this periodic signal.

A periodic signal necessary for control of the spindle motor can always be obtained in a read regardless of the presence/absence of data in the optical disk. Accordingly, the write-in time can be shortened without any extra process of finalization in a write.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described below with reference to the several views of the accompanying drawing.

Figure 1:
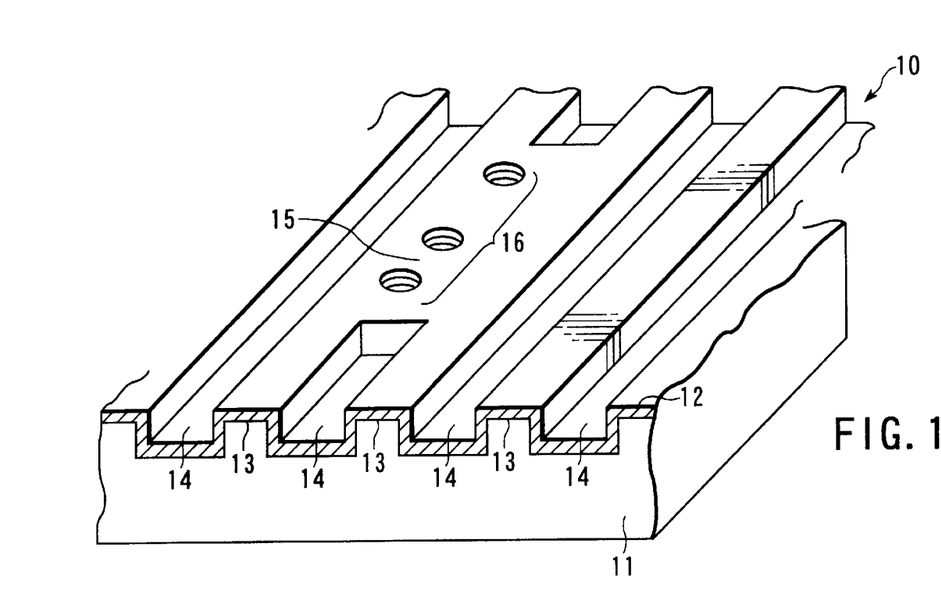
FIG. 1 is a partial enlarged perspective view showing an optical disk according to an embodiment of the present invention.
Figure 2:
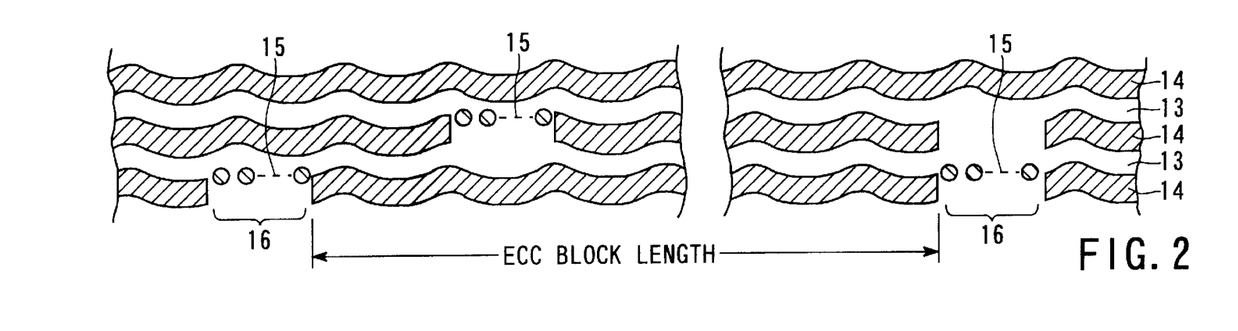
FIG. 2 is a plan view showing a track pattern on the optical disk.
Figure 3A:
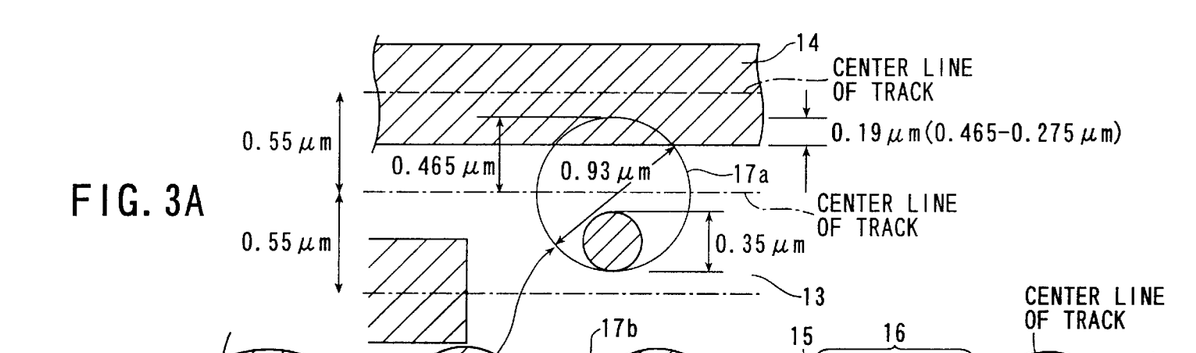
FIGS. 3A, 3B, and 3C are enlarged plan views showing part of the optical disk in FIG. 1.
Figures 3B, 3C:
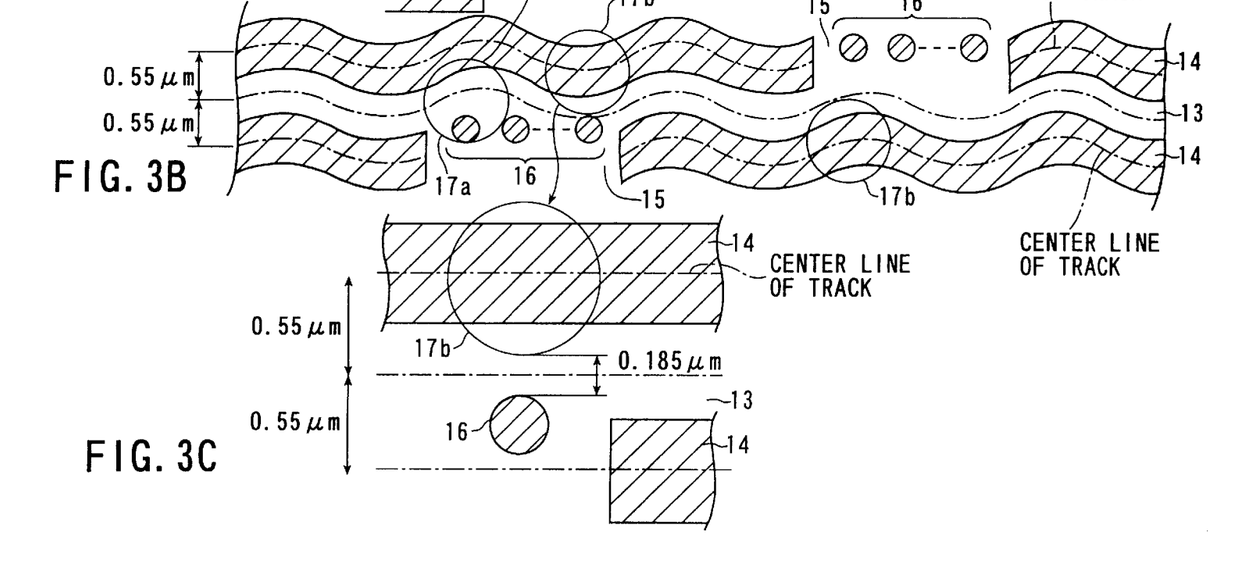
Figure 4A:
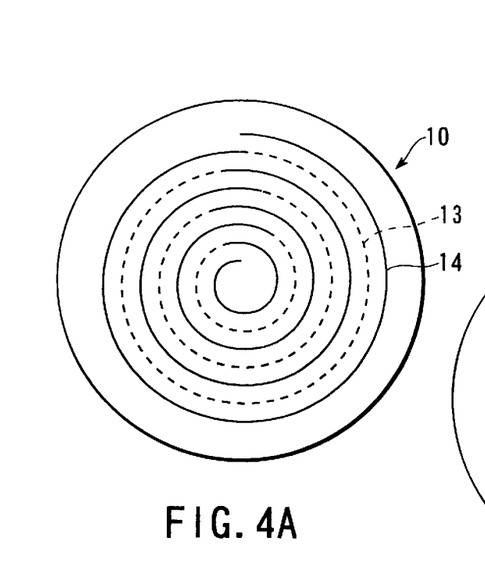
FIGS. 4A and 4B are plan views each showing a spiral format on the optical disk.
Figure 4B:
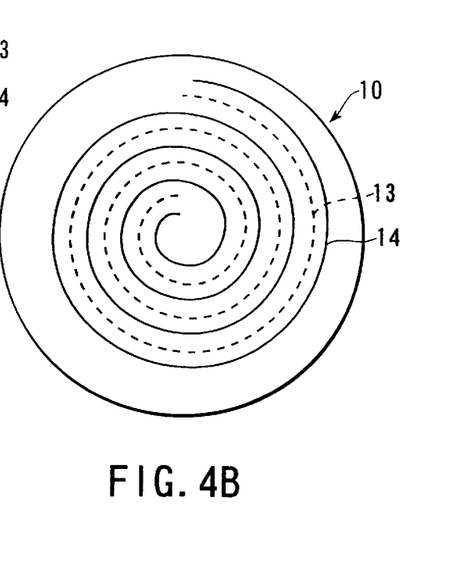

An optical disk according to an embodiment of the present invention will be first described. FIG. 1 is a partial enlarged view of the optical disk. FIG. 2 shows a track pattern on the optical disk. FIGS. 3A to 3C are enlarged views showing part of FIG. 2. FIGS. 4A and 4B show spiral formats on the optical disk, respectively.

As shown in FIG. 1, an optical disk 10 of this embodiment is formed by forming a readable and writable recording film 12, e.g., phase change film, and the like on a disk substrate 11. Land and groove tracks 13 and 14 are spirally formed on the disk substrate 11, as shown in FIGS. 1 to 4A and 4B. The land and groove tracks 13 and 14 can be laid out in two ways, i.e., a single-spiral format shown in FIG. 4A and a double-spiral format shown in FIG. 4B. In the single-spiral format, land and groove tracks 13 and 14 are alternately laid out on one spiral. In the double-spiral format, land and groove tracks 13 and 14 are respectively laid out on two parallel spirals. The land and groove tracks are alternately arranged adjacent to each other along the radial direction of the disk in either of the above formats. The present invention can be applied to either format.

In this embodiment, the land and groove tracks 13 and 14 are wobbled with a wobble pattern having a predetermined period, as shown in FIGS. 2 and 3A to 3C. For the sake of simplicity, the land and groove tracks 13 and 14 shown in FIGS. 1, 4A, and 4B are not wobbled.

As shown in FIGS. 1, 2, and 3A to 3C, the groove track 14 is partitioned midway, and the partition area serves as a land portion 15. Emboss pits 16 are formed on the boundary between the land portion 15 of the partition area and adjacent land tracks 13. The emboss pits 16 are formed on the disk together with the land and groove tracks by mask ring process when the disk is molded.

The emboss pits 16 provide recognition information for recognizing position of an error correction block (to be referred to as an ECC block hereinafter) on adjacent land and groove tracks positioned on both sides of the emboss pits. More specifically, the emboss pits 16 represent the boundary between ECC blocks and are formed at the period nearly equal to the ECC block length. The emboss pits 16 are formed from a plurality of, preferably three or more pits. If each group of the emboss pits are used simply for recognizing the position of the ECC block, all groups of the pits may have the same pit pattern. In FIGS. 1, 2, and 3A to 3C, the pits are circular. However, the pit shape is not limited to this, and may be an oval or elliptical shape, or a combination of them.

Since the emboss pits 16 are formed to recognize the ECC block, the emboss pits 16 may replace the partition area 15 on the groove track 14. Also, the mark or marks (for example, phase change mark) based on another form may be used in stead of the emboss pits. That is, semicircular pits or marks may be formed on the land track 13 as ECC block recognition information.

Forming the emboss pits 16 representing ECC block recognition information for each ECC block can increase the format efficiency, as will be described in detail later.

FIGS. 3A to 3C show detailed numerical examples of the land track 13, groove track 14, emboss pit 16, and optical beam spots 17a and 17b on the optical disk 10. FIGS. 3A to 3C show an example of a rewritable optical disk having a higher density than that of a current DVD-RAM. In this example, the track pitch (interval between the center lines of the land and groove tracks 13 and 14) is 0.55 μm, the width of the emboss pit 16 is 0.35 μm, the wavelength λ of an optical beam is 650 nm, the NA of the objective lens is 0.6, and the optical beam spot diameter is 0.93 μm.

A signal from the emboss pit 16 is detected while the optical beam spot 17a traces the land track 13. At this time, since the optical beam spot 17a also traces part of a groove track 14 adjacent to the traced land track 13, the influence of a recording mark such as a phase change mark formed on the groove track 14 must be considered.

The optical beam spot 17a overlaps the groove track 14 by a width of 0.19 μm which is a difference obtained upon subtracting 0.275 μm that is ½ the track pitch from 0.465 μm that is ½ the optical beam spot diameter. The optical beam spot 17a overlaps the groove track 14 adjacent to the land track 13 by a length of about 0.4 μm. The emboss pit 16 has a width, i.e., track width direction size of 0.35 μm. The emboss pit 16 is formed at a position where the entire width falls within the optical beam spot 17a.

Considering, therefore, the relationship between the size the optical beam spot 17a overlaps the emboss pit 16 and the size it overlaps the groove track 14, the emboss pit 16 can be reliably detected substantially free from any influence of a recording mark formed on the groove track 14 by the optical beam spot 17a.

While the optical beam spot 17b traces the groove track 14, the influence of the emboss pit 16 on detecting a recording mark formed on the groove track 14 must be considered.

The emboss pit 16 is formed on the boundary between the land portion 15 in the partition area of the groove track 14 and the land track 13. The distance between the optical beam spot 17b and emboss pit 16 is 0.185 μm which is a difference obtained upon subtracting 0.465 μm that is ½ the optical beam spot diameter and 0.175 μm that is ½ the width of the emboss pit 16 from 0.825 μm that is 1.5 times the track pitch. This means that the optical beam spot 17a and emboss pit 16 are sufficiently spaced apart from each other. Therefore, a recording mark formed on the groove track 14 can be reliably detected without any influence of the emboss pit 16.

The emboss pit 16 is formed on the boundary between the land portion 15 partitioning the groove track 14 and an inner or outer adjacent land track 13 in the radial direction of the disk. ECC block recognition information provided by the emboss pit 16 is therefore shared by adjacent land tracks 13 and the groove track 14.

In this manner, even when the track pitch is decreased to increase the density of the optical disk 10 more than a current DVD-RAM, and the optical beam spot is downsized to cope with a narrow track pitch, a signal from the emboss pit 16 can be detected at a high SNR without any influence of a recording mark on an adjacent groove track 14. At the same time, a signal from a recording mark on the groove track 14 adjacent to a position where the emboss pit 16 is formed can be reliably detected without any influence of the emboss pit 16.

An optical disk apparatus for driving the above-described optical disk 10 to write/read out data will be explained with reference to FIGS. 5A and 5B.

Figure 5A:
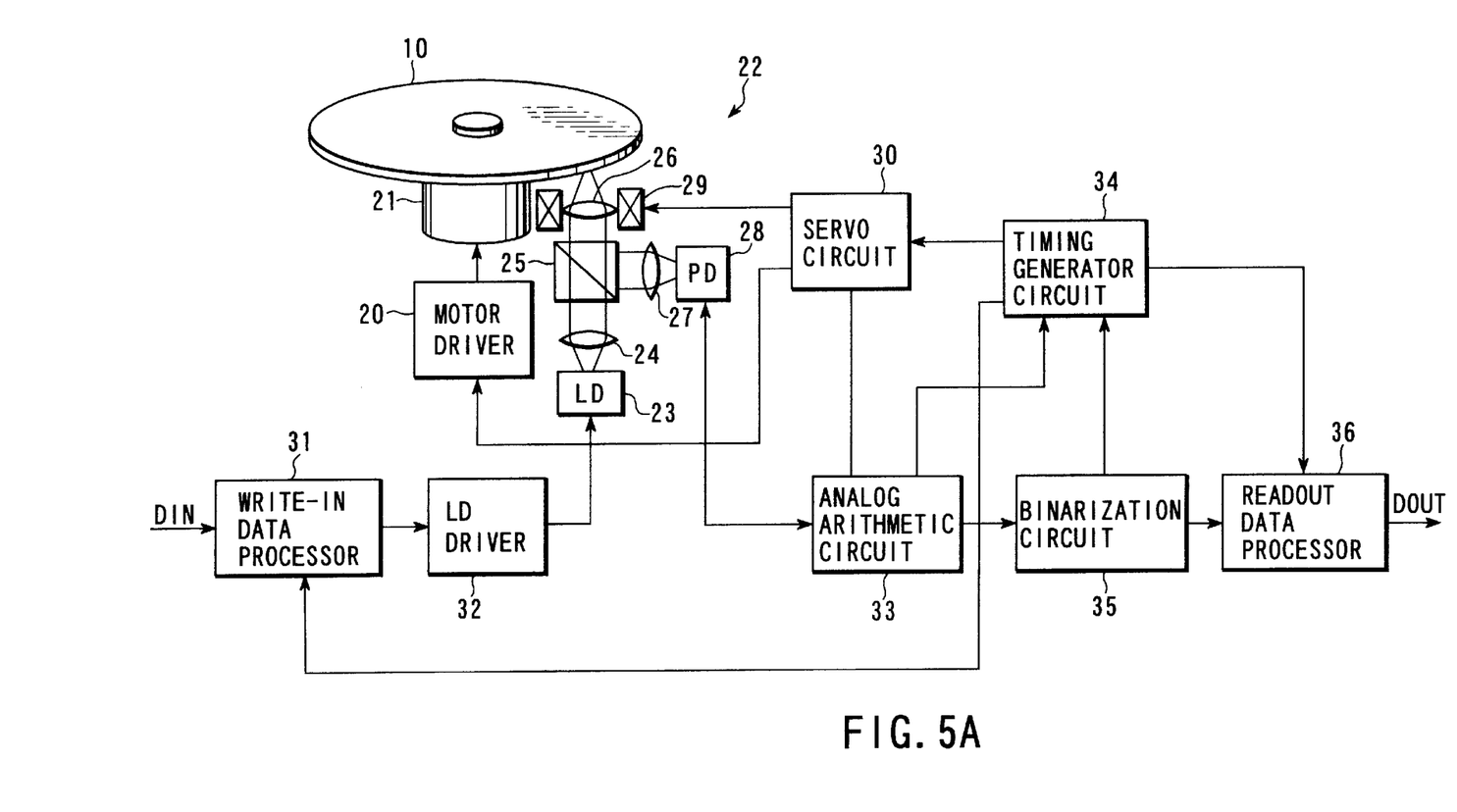
FIGS. 5A and 5B are block diagrams showing the arrangement of an optical disk apparatus according to an embodiment of the present invention.
Figure 5B:
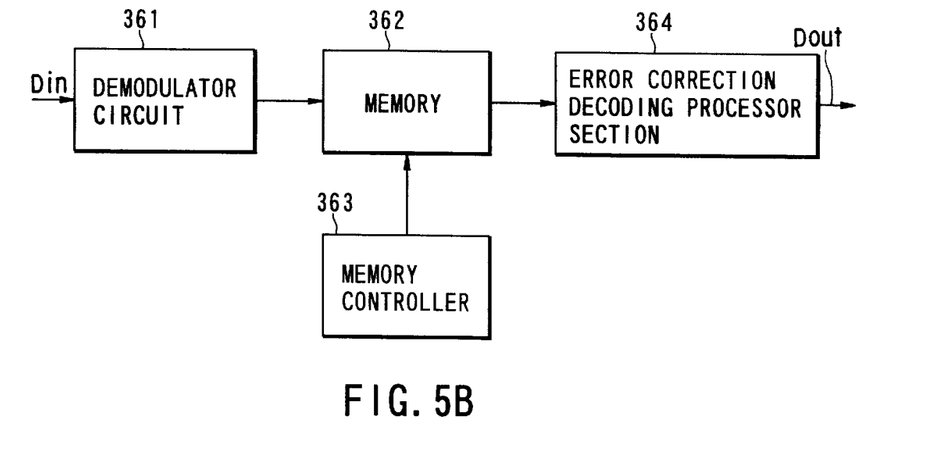

In FIG. 5A, the optical disk 10 is rotated by a spindle motor 21 driven by a motor driver 20, and data is written in or read out from the optical disk 10 by an optical head 22 that faces the optical disk 10. The optical head 22 is constituted by a laser diode (LD) 23 serving as a light source, a collimator lens 24 for collimating an optical beam emitted by the laser diode 23, a beam splitter 25 for splitting incident light on the optical disk 10 and reflection light by the optical disk 10, an objective lens 26 for focusing the optical beam passing through the beam splitter 25 and irradiating the optical beam as a small optical beam spot onto the optical disk 10, a condenser lens 27 for condensing the reflection light reflected by the optical disk 10 and guided by the beam splitter 25, a photo-detector 28 for detecting the condensed reflection light, and a lens actuator 29 for moving the objective lens 26 in the optical axis direction (focusing direction) and tracking direction.

An example of the photo-detector 28 is a multi-segment split photo-detector in which the detection area is divided into a plurality of, e.g., four areas. A plurality of output signals from the photo-detector 28 are input to an analog arithmetic circuit 33. The analog arithmetic circuit 33 generates a readout signal corresponding to data written in the optical disk 10, focus error and tracking error signals for focusing servo control and tracking servo control, and a speed control signal for controlling the rotation speed of the spindle motor 21. The focus servo control is for making the focal point of the objective lens 26 coincide with the recording surface on the optical disk 10. The tracking servo control is for making an optical beam irradiated on the optical disk 10 trace the track.

The focusing and tracking error signals are input to a servo circuit 30, and the objective lens 26 is controlled by the lens actuator 29 in the focusing and tracking directions under the control of the servo circuit 30. The servo circuit 30 controls the motor driver 20 in accordance with the speed control signal generated on the basis of a periodic signal (to be described later) obtained from the optical disk 10.

Write-in operation and readout operation will be briefly explained.

Write-In Operation

In a write, a write-in data stream Din as data to be written is processed by a write-in data processor 31 and then input to an LD driver 32. The LD driver 32 modulates the intensity of the laser diode 23. An optical beam whose intensity is modulated is irradiated on the optical disk 10 via the collimator lens 24, beam splitter 25, and objective lens 26 to write data on the recording film 12 of the optical disk 10 as a recording mark such as a phase change mark from a crystalline or amorphous state to an amorphous or crystalline state.

In a write, reflection light by the optical disk 10 is incident on the photo-detector 28 via the objective lens 26, beam splitter 25, and condenser lens 27. An output from the photo-detector 28 is input to the analog arithmetic circuit 33 to generate a signal (to be referred to as an emboss pit signal hereinafter) corresponding to the emboss pit 16 on the optical disk 10, and a periodic signal whose amplitude changes in correspondence with the wobble pattern of the land and groove tracks on the optical disk 10.

A timing generation circuit 34 generates ECC block recognition information corresponding to the emboss pit 16 in accordance with the emboss pit signal, and a speed control signal in accordance with the periodic signal. The ECC block recognition information is used to generate an ECC block in the write-in data processor 31 and generate sector address information. This processing will be explained in detail below. The speed control signal is input to the servo circuit 30. On the basis of this signal, the servo circuit 30 controls the spindle motor 21 to a predetermined rotation speed via the motor driver 20.

In a write, the analog arithmetic circuit 33 further generates focusing and tracking error signals, and the servo circuit 30 controls the lens actuator 29 based on these signals, thereby performing focusing servo control and tracking servo control.

Readout Operation

In a read, an optical beam with a predetermined intensity emitted by the laser diode 23 is irradiated onto the optical disk 10 via the collimator lens 24, beam splitter 25, and objective lens 26. The reflection light by the optical disk 10 is incident on the photo-detector 28 via the objective lens 26, beam splitter 25, and condenser lens 27. An output from the photo-detector 28 is input to the analog arithmetic circuit 33 to output as a readout signal a change in reflectivity depending on the presence/absence of a recording mark on the recording film 12.

Also in a read, the analog arithmetic circuit 33 generates a periodic signal corresponding to the wobble pattern on the optical disk 10, a focusing error signal, and a tracking error signal. The timing generation circuit 34 generates a speed control signal in accordance with the periodic signal, and the servo circuit 30 controls the spindle motor 21 to a predetermined rotation speed via the spindle motor 21 on the basis of the speed control signal. The servo circuit 30 controls the lens actuator 29 on the basis of the focusing and tracking error signals, thereby performing focusing servo control and tracking servo control.

A readout signal corresponding to the recording mark that is output from the analog arithmetic circuit 33 is converted into binary data by a binarization circuit 35, and the binary data is input to the timing generation circuit 34. From the binary data, the timing generation circuit 34 detects a sync pattern, more particularly, the position and pattern of a sync pattern in the readout signal. Since the readout signal includes a bit error generated by a medium defect of the optical disk 10 or the influence of noise, the timing generation circuit 34 may fail to detect the sync pattern at a position where the sync pattern should be detected, or may erroneously detect a sync pattern at a position different from the real sync pattern position. The timing generation circuit 34 has a function of accurately detecting the position of the sync pattern in consideration of these influences. The timing generation circuit 34 determines the boundaries of a demodulation symbol, write-in block, and demodulated write-in sector using a sync pattern detection signal representing one of sync pattern sequences SY0 to SY7 (to be described later) as the sync pattern, in addition to the sync pattern detection position signal.

An output from the binarization circuit 35 is input to a readout data processor section 36. As shown in FIG. 5B, the readout data processor section 36 is comprised of a demodulator circuit 361, a memory 362, a memory controller 363 for controlling the memory, and an error correction decoding processor section 364. The demodulator circuit 361 performs processing almost reverse to the processing of the write-in data processor section 31, thereby outputting a readout data stream Dout.

Figure 6:
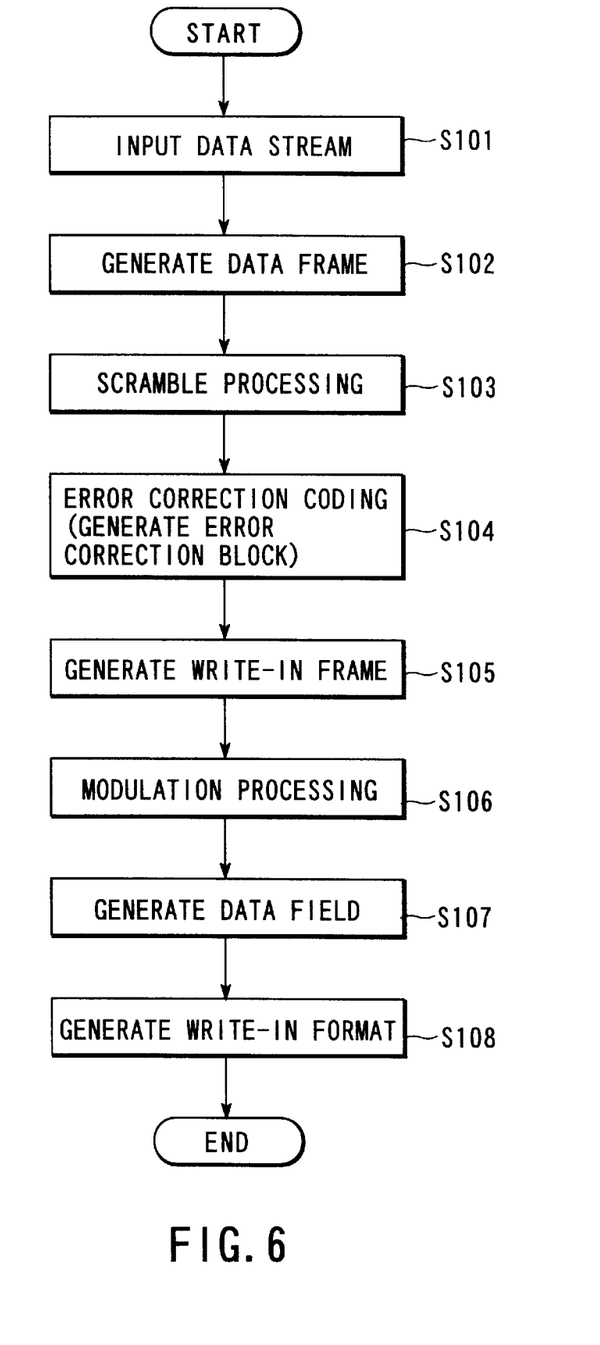
FIG. 6 is a flow chart showing the processing procedure of a write-in data processor section in this embodiment.

The write-in data processor section 31 will be described in detail. FIG. 6 shows the processing procedure of the write-in data processor section 31.

A write-in data stream Din is input from, e.g., a host system (not shown) (step S101).

A data frame is generated from the write-in data stream Din input in step S101 (step S102). In the data frame generation step S102, the write-in data stream Din is divided into data sectors in units of 2,048 bytes, and a 178×12-byte data frame is generated from each data sector.

Figure 7:
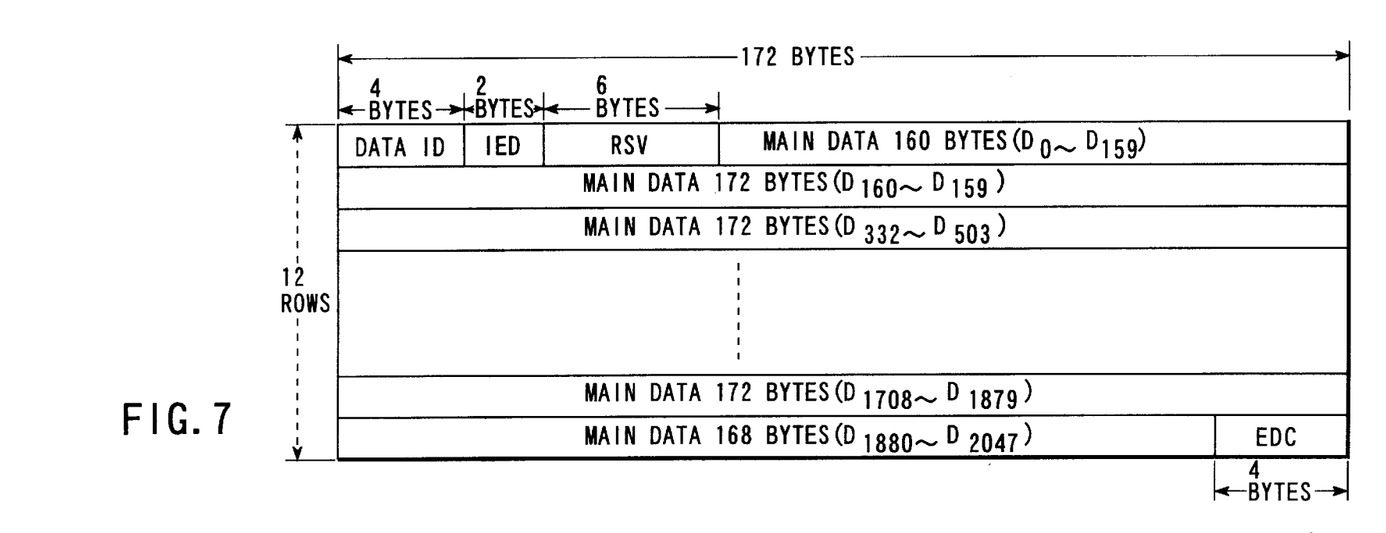
FIG. 7 is a view showing the structure of a data frame.

FIG. 7 shows the structure of the data frame. As shown in FIG. 7, the data frame is formed from 2,064 bytes, i.e., 12 rows each composed of 172 bytes. The first row is composed of 4-byte data identification data (data ID), a 2-byte ID error detection code (IED) for detecting any error generation in the data ID, 6 reserve bytes (RSV), and 160-byte main data $D_0$ to $D_{159}$. The main data is a data sector element. The second to 11th rows are respectively composed of 172-byte main data $D_{160}$ to $D_{331}$, $D_{332}$ to $D_{503}$, ..., $D_{1708}$ to $D_{1879}$. The last 12th row is composed of 168-byte main data $D_{1880}$ to $D_{2047}$ and a 4-byte error detection code (EDC) for detecting any error generation in the data frame.

Figure 8A:
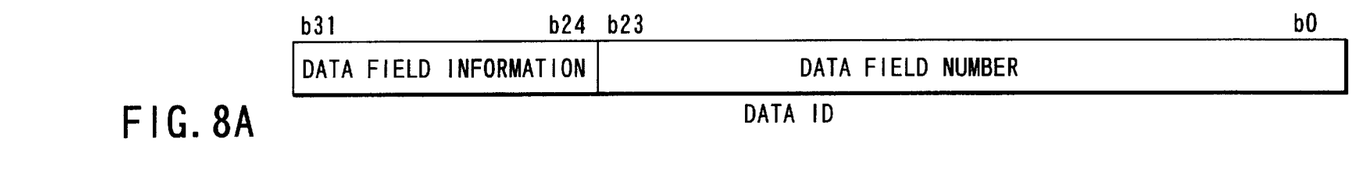
FIGS. 8A and 8B are views showing the structure of data ID and sector information, respectively.
Figure 8B:
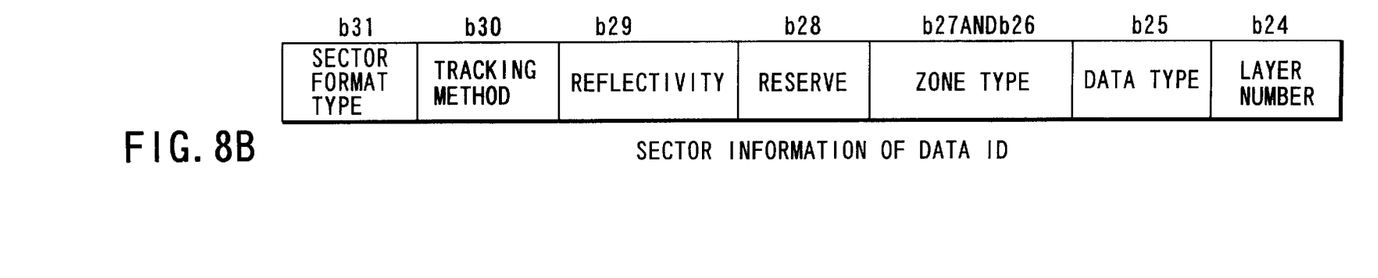

The data ID will be explained in more detail. As shown in FIG. 8A, the data ID is composed of bits successively numbered such that the least significant bit is b0 and the most significant bit is b31. The respective bits of the most significant 1-byte data field information have the following meanings and are set as follows:

bit b31 (sector format type): set to "1" and represents a zoned format bit b30 (tracking method): set to "0" representing pit tracking at the emboss portion within the lead-in zone, and "1" representing group tracking in the remaining zone bit b29 (reflectivity of recording film): set to "1" and represents a reflectivity of 40% or less bit b28 (reserve): set to "0"

bits b27 & b26 (zone type): set to "00" in the data zone, "01" in the lead-in zone, and "10" in the lead-out zone bit b25 (data type): set to "0" when data of the data sector is read-only data, and "1" when data is rewritable data, and bit b24 (layer number): set to "0" and represents that only one recording film can be accessed from one incident surface.

In the data field number composed of lower 3 bytes of bits b23 to b0, the emboss portion and defect management region within the lead-in zone and the reserve zone represent binary sector numbers, the data zone represents initialized and re-initialized data field numbers, and the defect management region within the lead-out zone and the reserve zone represent binary sector numbers.

After the data frame is generated in step S102, scramble processing is performed (step S103). In this scramble processing, main data $D_k$ (k=0 to 2,047) within the data frame is replaced with $D_k'$ (k=0 to 2,047) scrambled by $D_k' = D_k$ XOR $S_k$ k=0 to 2047 where XOR is the exclusive logical addition.

$S_k$ is the random data stream, e.g., M stream for scramble processing and is generated by the following procedure. More specifically, a 15-bit shift register is prepared. Outputs from the most significant bit and the fifth bit from it are exclusive-ORed to input the result to the least significant bit, thereby forming a so-called feedback shift register. Scramble data uses a lower 8-bit output from the feedback shift register. Every time scramble data is extracted, the feedback shift register is shifted eight times in the upper bit direction, and next scramble data is extracted.

Scramble data generated by this procedure and main data are exclusive-ORed for each bit to perform scramble processing. In this case, a scramble data stream to be generated can be switched by changing the initial value of the feedback shift register. The initial value is switched in accordance with the contents of the data ID within the data field.

Error correction coding is performed for the data frame (to be referred to as a scrambled frame) after scramble processing in step S103 to generate an ECC block (step S104).

Figure 9:
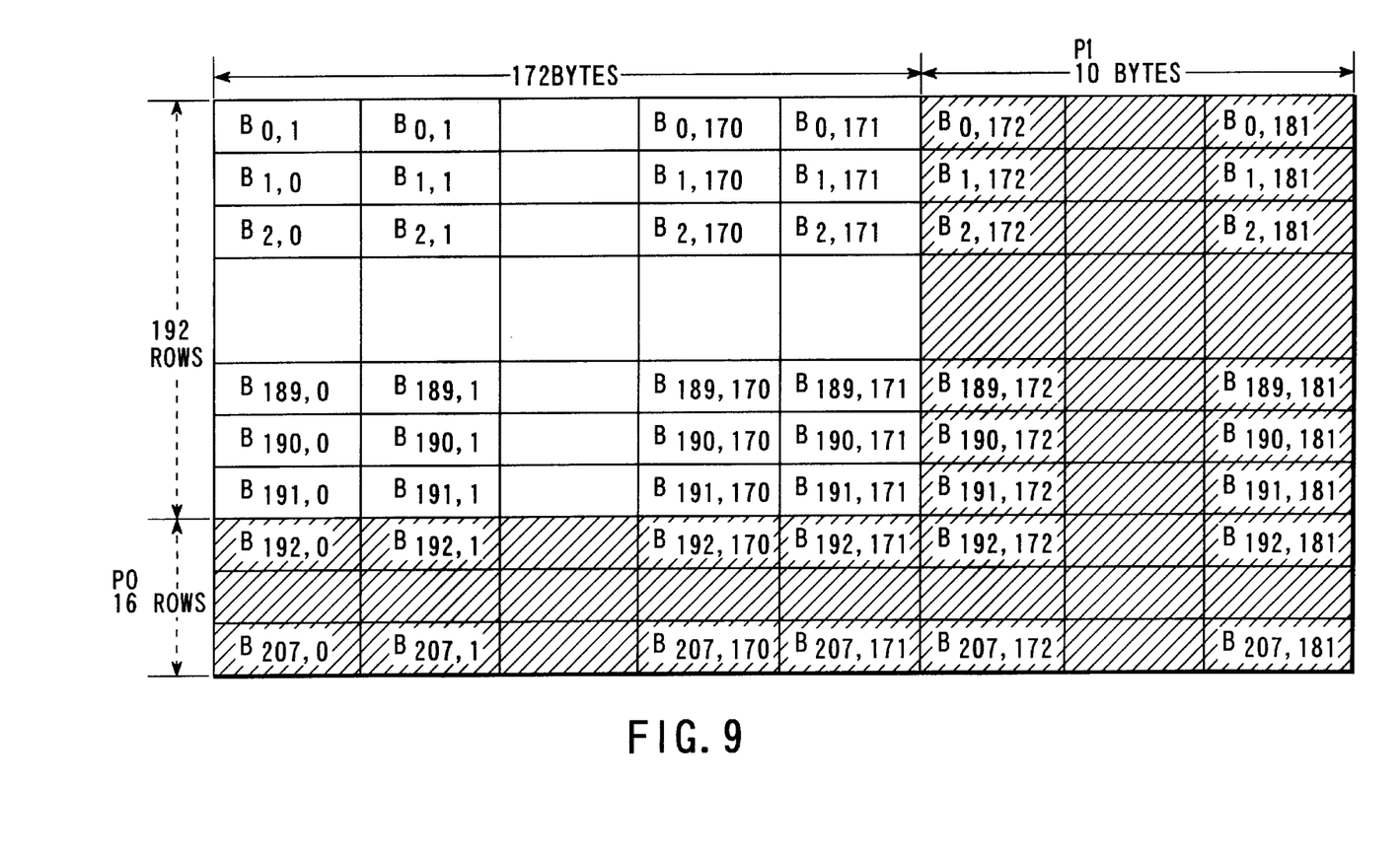
FIG. 9 is a view showing the logical structure of an ECC block.

FIG. 9 shows the structure of the ECC block. The ECC block is formed from 182 bytes×208 rows such that scrambled frames are stacked in 192 rows each having 172 bytes, 16 bytes are added as an outer code parity PO to the 192 rows to obtain 208 rows, and 10 bytes are added as an inner code parity PI to each row to obtain a 182-byte row. Letting i be the row number and j be the column number, each byte $B_{i,j}$ is given by $B_{i,j}$ for i=0 to 191, j=0 to 171: bytes from the scrambled frames $B_{i,j}$ for i=192 to 207, j=0 to 171: bytes of outer code parity $B_{i,j}$ for i=0 to 207, j=172 to 181: bytes of inner code parity The generation procedure of the ECC block will be described in more detail. Sixteen scrambled frames each formed from 12 rows are stacked. Error correction coding is performed for the group of 16 scrambled frames as an error correction coding data unit to add a check parity, thereby generating an ECC block. This error correction coding uses the double-product code of a Reed-Solomon code.

That is, coding (outer coding) is performed for data of the 192 rows of the 16 stacked scrambled frames to generate a 16-byte outer code parity PO. The outer code is a (208,192, 17) RS code. The same outer coding is repeated for all the columns (172 columns) of the 16 stacked scrambled frames. Next, coding (inner coding) is performed for 172-byte data of each row of the 16 stacked scrambled frames to generate a 10-byte inner code parity PI. The inner code is a (182, 172,11) RS code. The same inner coding is repeated for all the rows of the 16 stacked scrambled frames, i.e., the 208 rows including the outer code parity PO.

One outer code parity PO formed from 16 rows is interleaved in every 12 rows of the ECC block in FIG. 9 generated in step S104, thereby generating a write-in frame. More specifically, the write-in frame is generated by rearranging byte $B_{i,j}$ of the ECC block into $B_{m,n}$ given by m=i+int [i/12] and n=j,i≦191 m=13(i−191)−1 and n=j,i≦192 where int[x] is an integer equal to or less than x.

Figure 10:
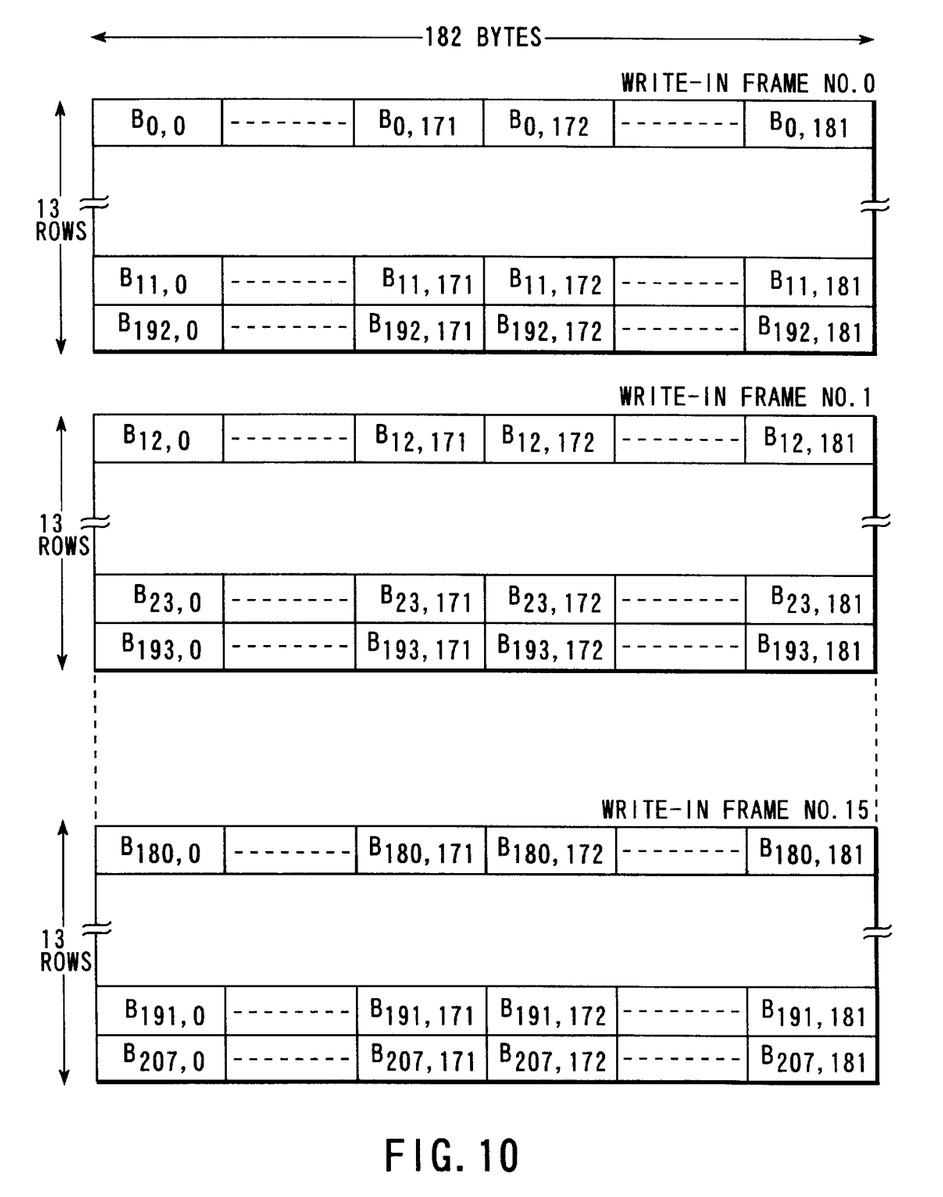
FIG. 10 is a view showing the structure of a write-in frame.

As a result, the 37,856 bytes of the ECC block are rearranged into 16 write-in frames each formed from 2,366 bytes, as shown in FIG. 10. Each write-in frame has 182 bytes×13 rows.

Data of the write-in frame generated in step S105 is converted, i.e., modulated in accordance with the signal transmission characteristics of the optical disk 10 and optical head 22 serving as a write-in/readout system (step S106). To decrease the write-in density (line density) on the optical disk 10 as much as possible, the write-in signal desirably has a low maximum frequency. In terms of signal transmission, the write-in signal has a low frequency component. Considering the two requirements, the modulation scheme in step S106 is generally a scheme in which frequency components concentrate in a middle range. As the modulation scheme, this embodiment adopts, e.g., 8/16 modulation of converting 8-bit data into a 16-bit-code word composed of RLL (2,10) codes in which the run length of "0"s is limited to "2" and the run length of "1"s is limited to "19". The 16-bit-code word is NRZ-I-converted into channel bits. The channel bits mean elements representing modulated binary data "1" and "0" as pits or marks on the optical disk 10.

Figure 11:
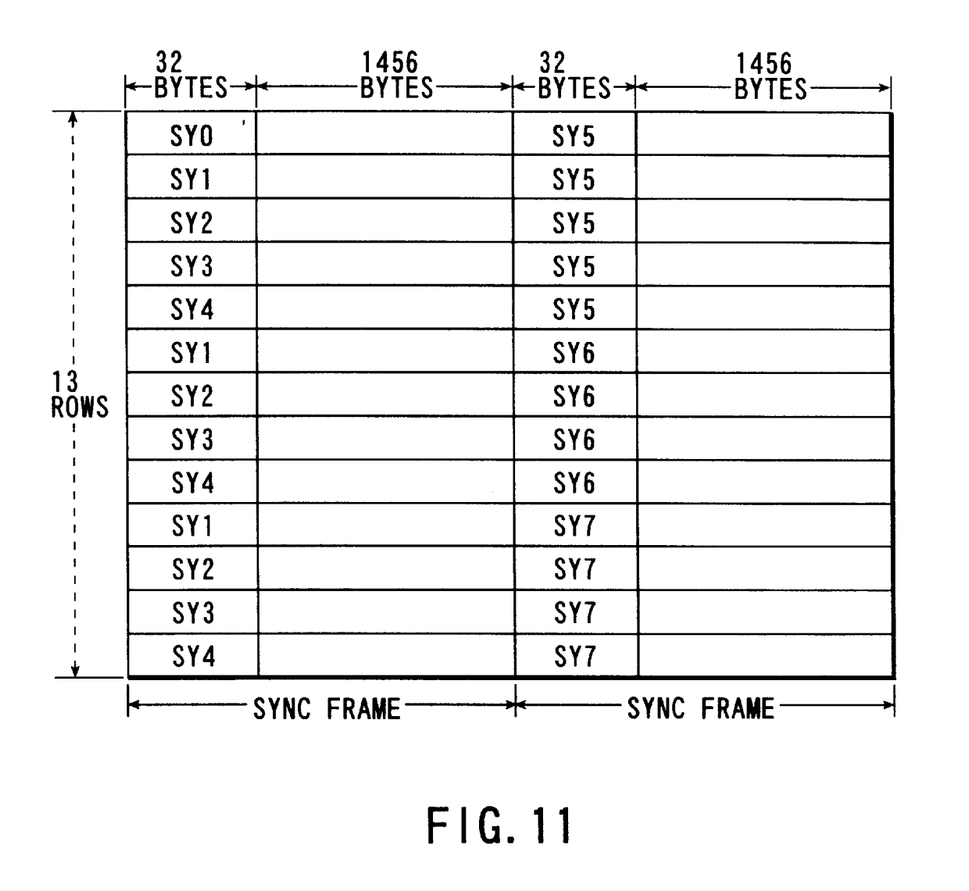
FIG. 11 is a view showing the structure of a data field.

A data field to be written in the optical disk 10 is generated from the write-in frame modulated in step S106. When data written in the optical disk 10 is to be read out, the boundary of the write-in frame must be determined to reconstruct the original data. Accordingly, in step S107, as shown in FIG. 11, a 32-bit sync pattern is added to the start of 1,456 channel bits of each modulated write-in frame to generate a 1,488-bit sync frame, thereby forming a data field. The data field is constructed from 13 rows each made up of two sync frames. The 1,456 channel bits in each sync frame represent first 91 and second 8 bytes of one row of the write-in frame. Each row of the data field indicates each row of the write-in frame.

A desirable sync pattern is one that can be easily detected from the write-in data stream but is not erroneously detected. In FIG. 11, eight types of sync pattern sequences SY0 to SY7 are prepared as the sync pattern. One sync pattern is selected from these sync pattern sequences SY0 to SY7 in accordance with the position of the write-in frame within the modulated data field.

Finally, the write-in format of the ECC block is generated from the data field generated in step S107. The intensity of an optical beam emitted from the laser diode 23 by the LD driver 32 is modulated in accordance with the generated write-in format to write data in the optical disk 10 in the above-mentioned fashion. The write-in format of the ECC block will be described in detail below.

The readout data processor section 36 in FIG. 5B will be explained.

The demodulator circuit 361 segments binary data from the binarization circuit 35 into 16-bit data at the boundary of a demodulation symbol, and then performs processing reverse to modulation, i.e., 16/8 demodulation to convert the segmented data into 8-bit data, generating reconstruction data. In this case, the relative position of the sync frame with respect to the start of the modulated write-in frame is determined by determining which of the sync pattern sequences SY0 to SY7 is the sync pattern of the sync frame in the reconstruction data stream.

The demodulator circuit 361 extracts data identification data (data ID) from the reconstruction data using the start of the write-in frame as a reference. The demodulator circuit 361 checks the extracted data ID for an error using an ID error detection code (IED). To protect the reliability, the demodulator circuit 361 sequentially writes the reconstruction data in the memory 362 using the start of the write-in frame and the data ID as a reference.

When the reconstruction data of 16 write-in frames constituting one ECC block are written in the memory 362, the memory controller 363 reads out an inner code parity from the memory 362 and transfers it to the error correction decoding processor section 364. Upon reception of it, the error correction decoding processor section 364 corrects an inner code error. If an error exceeding the inner code error correction ability exists, the error correction decoding processor section 364 determines a failure in correcting the error and generates an error flag. The error correction decoding processor section 364 writes error-corrected data and the error flag in the memory 362.

When the error correction decoding processor section 364 completes error correction for all the inner codes within the ECC block, the memory controller 363 reads out an outer code parity from the memory and similarly transfers it to the error correction decoding processor section 364. The error correction decoding processor section 364 corrects an outer code error. Parallel to a read of the outer code parity, the memory controller 363 reads out the error flag generated in correcting the inner code error. The error correction decoding processor section 364 uses this error flag to perform erasure correction. Similar to correction of the inner code error, the error correction decoding processor section 364 writes error-corrected data and an error flag.

The memory controller 363 reads out the error-corrected data in the memory 362, and descrambles data scrambled in generating write-in data. The descramble processing is performed by exclusive-ORing the same random data stream as in scramble processing and the error-corrected data. The descrambled data read out from the memory 362 is output as a readout data stream Dout.

Figure 12:
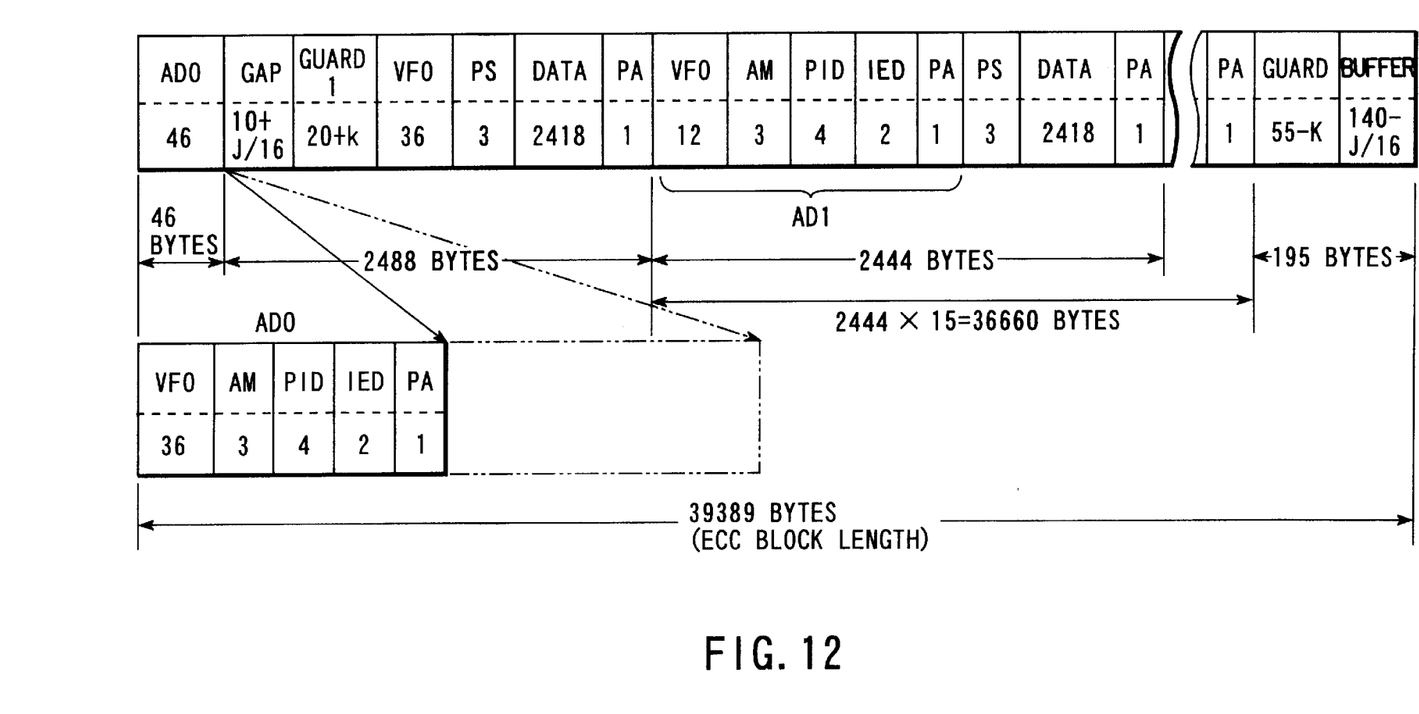
FIG. 12 is a view showing the write-in format of the ECC block on the optical disk in this embodiment.

FIG. 12 shows the write-in format of the ECC block on the optical disk 10 in this embodiment. In FIG. 12, the alphabets on the upper stage represent the content of each field, and the numeral on the lower stage represents the byte length. As shown in FIG. 12, address fields AD0 to AD15 (only AD0 is shown in FIG. 12) are arranged at the starts of respective sectors forming the ECC block. The sector address fields AD0 to AD15 are areas that store address information of the respective sectors forming the ECC block, and each sector address field is composed of VFO, AM, PID, IED, and PA fields.

Address information written in each sector address field is not subjected to error correction and can be detected without decoding error correction coded data. Therefore, even if the optical head deviates from a track, using this address information can minimize the damage and can shorten the seek time.

Generally, the disk is initialized prior to shipment. The initialization is a process for writing data such as physical address of each sector referring to the emboss pits formed in units of one ECC block. When DVD-RAM is initialized, an initialization check (certify) is performed to detect initialization defect and perform defect management. The address fields AD0 to AD15 are written in the disk in the initialization.

The initialization may be performed by the user, using an optical disk apparatus having initialization function. In the optical disk apparatus shown in FIG. 5A, for example, the initialization information including physical address information is processed by the write-in data processor 31, and input to the laser diode 23 via the LD driver 32. The laser diode 23 emits the light beam intensity-modulated in accordance with the initialization information. The light beam impinges on the disk via the collimator lens 24, the beam splitter 25 and the objective lens 26, so that the initialization of the disk is carried out.

When actual data is written in the initialized disk, a correct address is determined on the basis of the header address data AD0 of a head sector constituting each ECC block and then the area from the Gap field to the Guard field immediately before the Buffer field is rewritten. Accordingly, when the header address AD0 is written once in the initialization, it is not rewritten as long as the initialization is again performed. In contrast, the address data AD1 to AD15 are rewritten every time the ECC block is rewritten. In other words, the header address AD0 is information important for determining the address. A plurality of, preferably two to four header addresses are continuously provided as shown in FIG. 12. By providing such plurality of address data, accuracy for reading data can be improved.

In contrast, since the addresses AD1 to AD15 are rewritten every time, one or two addresses are sufficient for addressing.

The header address data AD0 may be formed by emboss pits described above. In such disk, the data writing can be performed without initializing from an arbitrary position.

In writing data, Gap and Guard1 fields are formed subsequent to the first sector address field AD0. Subsequent to the Guard1 field, VFO, PS, DATA, first sector DATA, and PA fields are sequentially written as phase change marks. PS, second sector DATA, and PA fields are sequentially written as phase change marks after the second sector address field AD1 composed of VFO, AM, PID, ID, and PA fields.

Similarly, the sector address field ADn (n=1, 2, ..., 15) and subsequent PS, DATA, and PA fields are written n=15 times as phase change marks.

Guard2 and Buffer fields are formed after the 16th sector address field AD15 and subsequent PS, 16th sector DATA, and PA fields, thereby completing one ECC block.

The content of each field will be explained. VFO Field

The VFO field synchronizes the variable frequency oscillator of a phase sync loop for readout channel bits. The VFO field in the ECC block address field (first sector address field) AD0, and the VFO field succeeding via the Gap and Guard1 fields have a 36-byte length each. The VFO fields in the second to 16th sector address fields have a 12-byte length each.

AM (Address Mark) Field

The AM field establishes byte synchronization of the optical disk apparatus for the next PID field. This field is formed from a mark pattern that cannot be obtained by 8/16 modulation, and has a 3-byte length.

PID (Physical Identification Data) Field

The PID field is 4-byte data composed of a reserve area, PID number, sector type, layer number, and sector number.

IED (ID Error Detection code) Field

The IED field is 2-byte data for detecting any error in the data ID.

PA (PostAmble) Field

The PA field is data for completing 8/16 modulation of the last byte in a preceding field (IED or DATA field) and has a 1-byte length (16-channel-bit length).

Gap Field

The Gap field gives a standby time until an optical beam output from the laser diode 23 serving as a light source increases to a predetermined power, and has a (10+J/16)-byte length, i.e., (160+J)-channel-bit length. J randomly changes within the range $0 \leq J \leq 15$. Variations in length of the Gap field are compensated for by the length of the Buffer field (to be described later).

Guard1 Field

The Guard1 field is assigned next to the Gap field and has a (20+K)-byte length. In this field, a predetermined 16-channel-bit pattern is repeated (20+K) times. K randomly changes within the range "0" to "7" in order to shift the positions of phase change marks formed in fields from the VFO field subsequent to the Guard1 field up to the Guard2 field. The first 20 bytes of the Guard1 field guard the start of the subsequent VFO field from deterioration of a signal upon many overwrites, and their contents are ignored in reading out data.

PS (Pre-Sync code) Filed

The PS field establishes byte synchronization for the next DATA field, and is formed from a unique channel bit pattern having a 3-byte (48-channel-bit) length.

DATA Field

In the DATA filed, data of the above-described data field is recorded as a phase change mark. The DATA field has a 2,418-byte length.

Guard2 Field

The Guard2 field is formed before the last Buffer field of the ECC block and has a (55−K)-byte length. In the Guard2 field, similar to the Guard1 field, a 16-channel-bit pattern is repeated (55−K) times. K is set such that the total length of the Guard1 and Guard2 fields becomes 71 bytes. The last 20 bytes of the Guard2 field guard the end of the DATA field from deterioration of a signal upon many overwrites. The remaining (55−K−20) bytes absorb variations in actual length of data written in the optical disk 10. The contents of these bytes are ignored in reading out data.

Buffer Field

The Buffer field comes last in the ECC block, and absorbs changes in actual sector length caused by variations in rotation speed of the optical disk 10 and decentering of the track in writing data, and random shifts of the write-in position and deterioration of start and end positions in phase change recording. In this embodiment, the Buffer field has a (140−J/16)-byte length. A Buffer field is formed for each sector in a current DVD-RAM, but for each ECC block, i.e., each 16 sectors in this embodiment. According to this embodiment, the format efficiency can be increased by a decrease in buffer area, compared to the current DVD-RAM.

The effects of increasing the format efficiency according to the present invention will be described with reference to a detailed numerical example.

In this embodiment, as shown in FIG. 12, each ECC block is formed from 2,488-byte first sector data composed of a 46-byte ECC block address AD0, a (10+J/16)-byte Gap field, a (20+K)-byte Guard1 field, a 36-byte VFO field, a 3-byte PS field, a 2,418-byte DATA filed, and a 1-byte PA filed, a total of 36,660-byte second to 16th sector data each composed of 2,444 bytes including a 12-byte VFO field, a 3-byte PM field, a 4-byte PID field, a 2-byte ID field, a 1-byte PA field, a 3-byte PS field, a 2,418-byte DATA field, and a 1-byte PA field, a (55−K)-byte Guard2 field, and a (25−J/16)-byte Buffer field. The ECC block length is 38,389 bytes.

According to this embodiment, therefore, the ECC block length decreases to 38,389 bytes/43,152 bytes=91%, compared to the current DVD-RAM. In other words, the capacity necessary to write the same data is 91% the capacity in the current DVD-RAM, and the format efficiency increases 9%.

Note that in this embodiment, the emboss pits 16 are used as recognition information representing the boundary (start) of the ECC block. An ECC block in which data is to be written can be recognized by counting the number of boundaries of ECC blocks.

As has been described above, according to the present invention, recognition information representing the boundary of the error correction block is written as emboss pits in the optical disk in advance. Data of each sector of the error correction block and address information of the sector are written on the basis of this recognition information. This arrangement allows to form a buffer area on the optical disk in units of one error correction block. Compared to a conventional optical disk in which address information in units of one sector is written as emboss pits, the buffer area can be greatly decreased to increase the format efficiency.

Since the positions of error correction blocks on the optical disk are determined in advance, data can be written in an arbitrary error correction block in writing data. From this viewpoint, the surface of the disk can be efficiently used as the data write-in area.

In addition, error correction is performed for data but is not for address information of the sector. The sector address can therefore be recognized in real time without decoding the error correction block. Even if an address error occurs during a write, the address can be easily corrected to avoid a failure of writing data at an erroneous address upon generation of the address error. Furthermore, since the address information can be speedy obtained in the seek operation, the wait time for data read and write is shorted.

In the optical disk apparatus according to the present invention, the land and groove tracks on the optical disk are wobbled with a wobble pattern having a predetermined period. Regardless of the presence/absence of a data write, a periodic signal corresponding to the wobble pattern can always be obtained from an output from the photo-detector for detecting reflection light by the optical disk. Even a ROM apparatus can control rotation of the spindle motor using the periodic signal. The write-in time can be shortened without any extra process of finalization in a write.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk comprising:
    land and groove tracks arranged radially adjacent to one another on said optical disk;
    a plurality of error correction blocks provided along said land and groove tracks, each of said error correction blocks containing a plurality of sectors and used for writing and reading data in units of an error correction block by a light beam; and
    a plurality of recognition marks, each one of the recognition marks formed on a boundary between the land and the groove tracks and representing a boundary between adjacent error correction blocks, each of the error correction blocks having a head sector which store address information and is provided after a corresponding one of the recognition marks.

2. An optical disk according to claim 1, wherein each of the recognition marks is formed an emboss pit.

3. An optical disk according to claim 1, wherein each one of the recognition marks is formed of an emboss pit pattern as a combination of emboss pits.

4. An optical disk according to clam 1, wherein said sectors include a head sector storing address information which is not subjected to an error correction encoding.

5. An optical disk according to claim 4, wherein each of said error correction blocks includes a head sector which stores a plurality of continuous header address information.

6. An optical disk according to claim 1, wherein the land and groove tracks define a wobbled pattern having a predetermined period.

7. An optical disk according to claim 1, wherein each of said groove tracks has a land portion for each of the error correction blocks, and each of the recognition marks are formed on a boundary between the land track and a land portion dividing each of the groove tracks.

8. An optical disk according to claim 1, wherein each of the error correction blocks has a buffer area.

9. An optical disk according to claim 1, wherein said land and groove tracks comprises land and groove tracks alternately laid out on one spiral.

10. An optical disk according to claim 1, wherein said land and groove tracks comprises land and groove tracks respectively laid out on two parallel spirals.

11. An optical disk apparatus for emitting a light beam to an optical disk having a plurality of error correction blocks each containing a plurality of sectors to write and read out data in and from the optical disk in units of an error correction block, comprising:

a detector which detects recognition marks of the optical disk having land and groove tracks arranged radially adjacent to one another and formed on a boundary between the land and groove tracks and representing a boundary between adjacent two of the error correction blocks each of the error correction blocks having a head sector which store address information and is provided after a corresponding one of the recognition marks; and a write-in device which writes the address information of the sectors constituting the error correction block on the basis of a detected one of the recognition marks.

12. An optical disk apparatus according to claim 11, wherein each of the error correction blocks has a head sector which stores a plurality of continuous header address information.

13. An optical disk apparatus according to claim 11, which includes a write-in device which writes data in units of an error correction block and address information other than the header address information on the basis of the header address information of the head sector of each of the error correction blocks.

14. An optical disk apparatus according to claim 11, wherein the land and groove tracks define a wobbled pattern having a predetermined interval, and which includes a signal generator which generates a periodic signal having an amplitude changing in accordance with a wobbled pattern and a controller which controls a rotation of the optical disk on the basis of the periodic signal.

15. An optical disk apparatus according to claim 11, wherein each of the recognition marks is formed from an emboss pit.

16. An optical disk according to claim 11, wherein each one of the recognition marks is formed of an emboss pit pattern as a combination of emboss pits.

17. An optical disk apparatus according to claim 11, wherein the land and groove tracks define a wobbled pattern having a predetermined period.

18. An optical disk apparatus according to claim 11, wherein said land and groove tracks comprises land and groove tracks alternately laid out on one spiral.

19. An optical disk according to claim 11, wherein said land and groove tracks comprises land and groove tracks respectively laid out on two parallel spirals.

20. An optical disk comprising:

a plurality of land and groove tracks alternately arranged in a spiral form on said optical disk:

at least one error correction block provided along each of said land and groove tracks, said error correction block containing a plurality of sectors and used for writing and reading data by means of a light beam; and a recognition mark formed on a boundary between radially adjacent two of the land and the groove tracks and representing a boundary between the error correction block and another error correction block adjacent thereto, the error correction block having a head sector which store address information and is provided after the recognition mark.

21. An said optical disk along two spirals, land and groove tracks arranged on said optical disk along two spirals, respectively;

a plurality of error correction block provided along each of said land and groove tracks, each of said error correction blocks containing a plurality of sectors and used for writing and reading data by means of a light beam; and a recognition mark formed on a boundary between the land and groove tracks and representing a boundary between the error correction blocks, each of the error correction blocks having a head sector which store address information and is provided after the recognition mark.

* * * * *